April 5, 1927.  1,623,849
C. F. ORRICK
SAFETY WHEEL GUARD
Filed Dec. 2, 1926
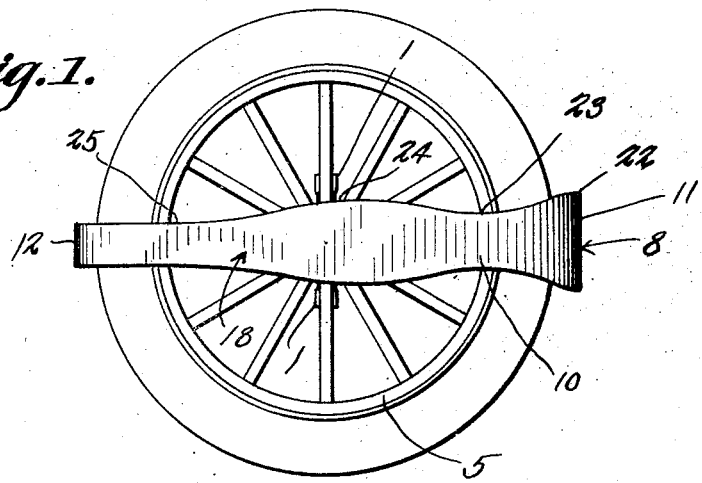
Fig. 1.
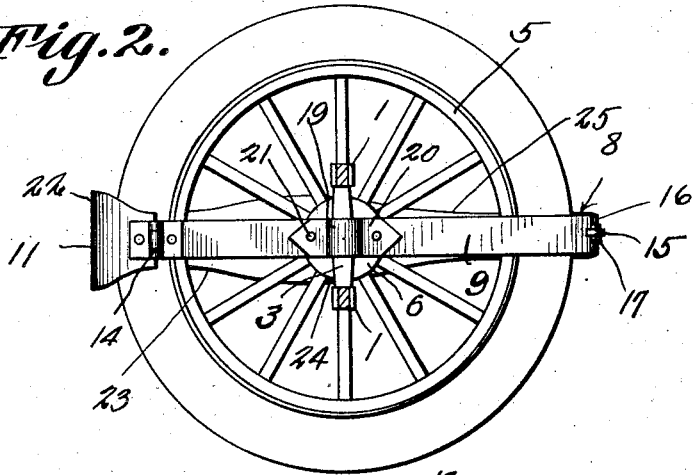
Fig. 2.
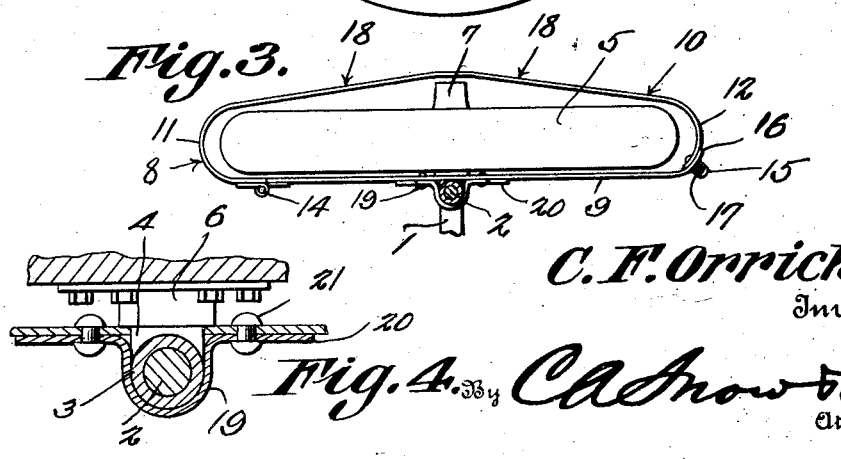
Fig. 3.
Fig. 4.
C. F. Orrick
Inventor,
By C. A. Snow & Co.
Attorneys.

Patented Apr. 5, 1927.

1,623,849

UNITED STATES PATENT OFFICE.

CHARLES F. ORRICK, OF MOUNT VERNON, ILLINOIS.

SAFETY WHEEL GUARD.

Application filed December 2, 1926. Serial No. 152,219.

This invention aims to provide novel means for holding an automobile wheel on the spindle whereon the wheel turns, and aims to provide means whereby the wheel is guarded and protected against being struck accidentally.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in elevation, a device constructed in accordance with the invention;

Figure 2 is an elevation showing the inside of the wheel and attendant parts, portions being in section;

Figure 3 is a top plan;

Figure 4 is a sectional detail enlarged from Figure 3.

The numeral 1 indicates the forks of the front axle of an automobile, the forks 1 being provided with a bearing member 2 on which a sleeve 3 is mounted to turn, the sleeve 3 carrying an outstanding axle end 4. A wheel 5 is journaled on the axle end 4, the hub of the wheel being designated by the numeral 6, and the hub cap being shown at 7.

The foregoing is the usual front wheel construction of an automobile, and no novelty is claimed for it, saving in so far as it may enter into patentable combinations with parts hereinafter described.

In carrying out the invention, there is provided a loop-shaped member 8 of such size that the wheel 5 may be received in it, with ample room for the wheel to turn. The loop-shaped metal member includes an inner section 9 and an outer section 10, the outer section 10 having curved ends 11 and 12, the end 12 of the outer member 10 being connected by a hinge 14 to one end of the inner member 9. The curved part 12 of the outer member 10 carries a keeper 15, adapted to be extended detachably through the adjacent inclined end portion 16 of the inner member 9. Through the keeper 15 may be inserted a bolt or the like, shown at 17, and serving to hold the keeper 15 against withdrawal from the end portion 16 of the inner section or member 9. The loop-shaped member 8 is disposed at the greatest diameter of the wheel 5, and, as shown at 18, the outer section 10 slopes outwardly, so as to clear the hub cap 7, as shown in Figure 3. A retainer, preferably in the form of a U-shaped metal strap 19 is engaged about the sleeve 3 to hold the U-shaped member 8 in place, the strap 19 having end portions 20 which are attached by securing elements 21 to the inner section 9. For the sake of strength, the outer section 10 is widest at its forward end, as shown at 22 in Figure 1. As it extends rearwardly, the outer section 10 tapers, as at 23, and then broadens as at 24, at a point opposite to the hub cap 7. Thence, the member 10 tapers as at 25, to its rear end. The general construction last-above described results in an economy of metal, since most metal is used where strength is needed.

The device is so constructed that it will protect the wheel 5 against blows, and also prevent the wheel from running off the axle end 4, should the usual securing means for holding the wheel rotatably on the axle end 4 become ineffective. When access to the wheel 5 is desired, the keeper 15 can be disengaged from the part 16, after the bolt 17 has been removed, and the outer section 10 can be swung to an open position on the hinge 14.

What is claimed is:—

1. In a device of the class described, a member, in the form of a closed loop, and means for holding a vehicle wheel for rotation within said member.

2. In a device of the class described, a member in the form of a closed loop and means for holding said member in place about a vehicle wheel for lateral swinging movement with the wheel in steering.

3. In a device of the class described, a loop-shaped member including inner and outer sections, means for hingedly connecting the said sections, means for holding the sections against opening movement on said means, and mechanism connected to the inner section for holding the loop-shaped member in place about a vehicle wheel.

In testimony that I claim the foregoing as my own, I have hereto affixed my signature.

CHARLES F. ORRICK.